O. E. MILES.

Axle.

No. 1,508. Reissued June 30, 1863.

Witnesses:

J. Andrews

W. A. Hendrickson

Inventor:

O. E. Miles

Per Thomas D. Stetson

Atty

N. PETERS, PHOTO-LITHOGRAPHER, WASHINGTON, D. C.

UNITED STATES PATENT OFFICE.

OREN E. MILES, OF AURORA, ILLINOIS.

IMPROVEMENT IN CONSTRUCTION OF WHEELED VEHICLES.

Specification forming part of Letters Patent No. 34,518, dated February 25, 1862; Reissue No. 1,508, dated June 30, 1863.

*To all whom it may concern:*

Be it known that I, O. E. MILES, of Aurora, in the county of Kane and State of Illinois, have invented a new and useful Improvement in the Construction of Wheel-Vehicles; and I do hereby declare that the following is a full, clear, and exact description of the same, reference being had to the accompanying drawings, making a part of this specification, in which—

Figure 3:
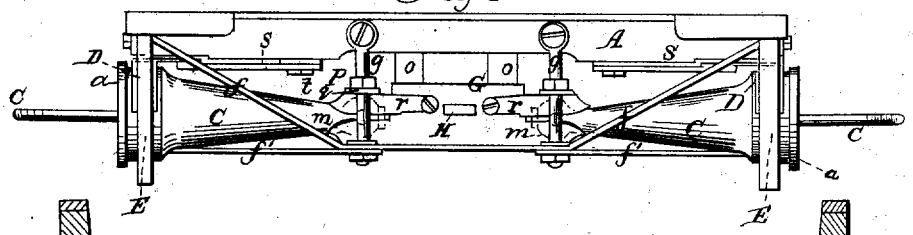
Figure 1:
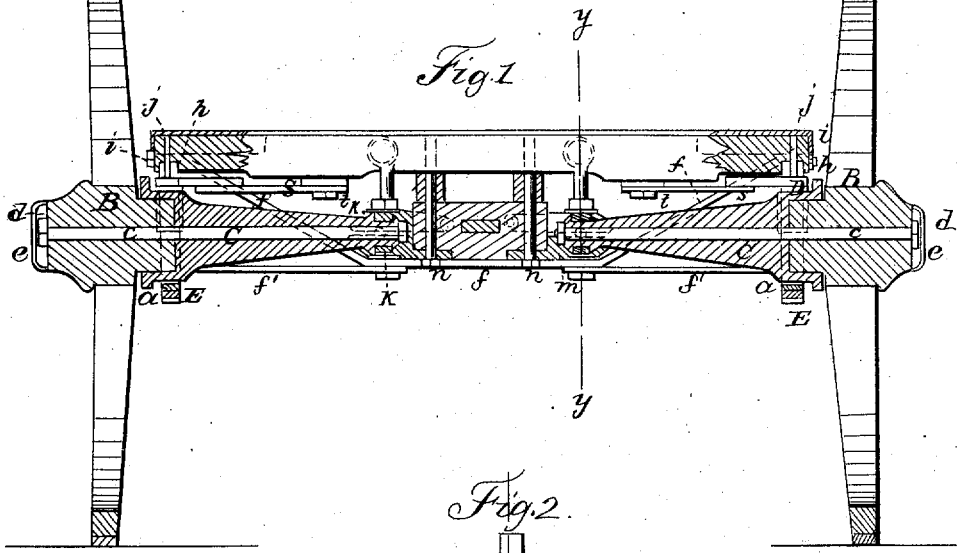
Figure 2:
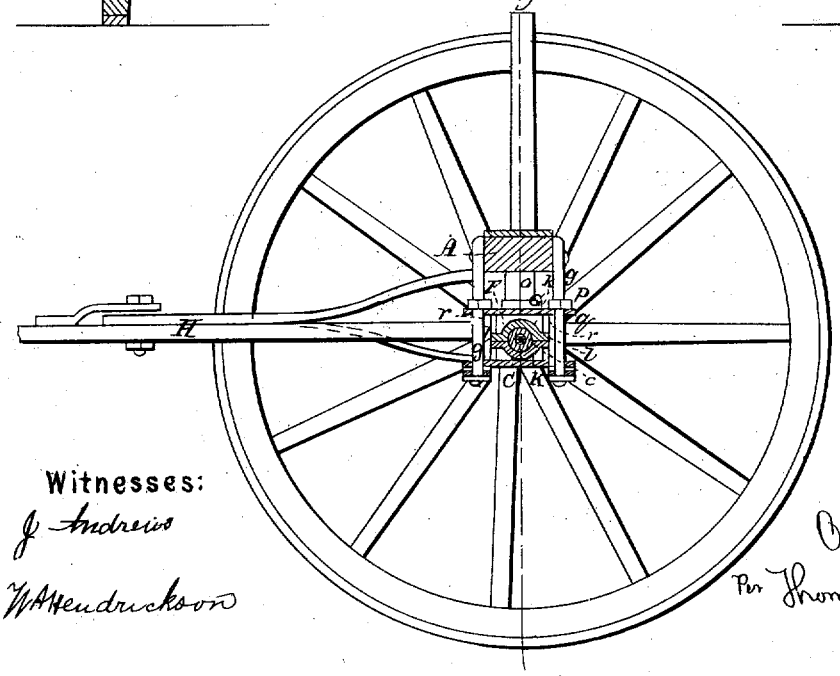

Figure 1 is a vertical section of the back running-gear of a four-wheel vehicle constructed according to my invention. *x x*, Fig. 2, indicates the line of section. Fig. 2 is a section of the same, taken in the line *y y*, Fig. 1. Fig. 3 is a back view of the back running-gear, with exception of the wheels and centers or hubs, which are supposed to have been removed.

Similar letters of reference indicate corresponding parts in the several figures.

This invention relates to a new and improved manner of hanging the wheels of the vehicle and arranging the same, as hereinafter fully shown and described, whereby it is believed that many advantages are obtained over the old method of construction.

To enable those skilled in the art to fully understand and construct my invention, I will proceed to describe it.

A represents the bolster, and B B the two wheels, of a vehicle. These wheels are each secured to a conical arm, C, as follows: The outer and larger parts, *a*, of the arms are of cylindrical form, and are hollow, so as to receive the inner parts of the hubs of the wheels B, and the hubs are firmly secured in the parts *a* by screw-rods *c*, which pass longitudinally through the arms C, and have their nuts *d* at the outer ends of the hubs, the nuts being covered by caps *e*, on the outer ends of the hubs. (See Fig. 1.)

The larger ends, *a*, of the arms C are fitted in boxes D, which are placed in cast-iron frames E, said frames being permanently attached to the ends of the bolster. The frames E are prevented from having any lateral motion or play in consequence of being well braced by steel rods at their upper and lower ends, the lower rods, *f'*, having a horizontal position and the upper ones, *f*, an inclined position, and connected by vertical bolts *g* to the bolster A, as shown clearly in Fig. 3.

The boxes D on the outer parts of the arms C are attached to the outer ends of flat springs *s s*, the inner ends of which are secured to the bolster A by bolts *t*. The springs *s* admit of a certain degree of yielding movement of the boxes D. Between the boxes D and the bolster A there are interposed india-rubber springs *h h*. These springs *h* are retained in their places by vertical pins *i*, said pins being cast with the boxes and fitting in holes *j* in the bolster. In cases where other forms of springs are used or where no springs are desired, the boxes D and their frames E may be cast in one piece, and the rubber springs *h* and flat springs *s* may be dispensed with.

The journals at the inner ends of the arms C have their bearings or boxes F, cast in two equal parts, *k k*, which, by means of trunnions *l l*, rest upon the ends of a cast-iron frame, *m*, which are secured to the under side of a block, G, said block being secured to the bolster A by bolts *n n*, that pass through pins or posts *v v*, interposed between the bolster and the block, the pins *v v* keeping the block a requisite distance below the bolster. (See Fig. 3.) The trunnions *l l* admit of the adjustment of the arms C to give the wheels a proper position. The block G receives the back end of the reach H. The leverage or weight downward upon the central part of the bolster A is counteracted by the rods *f* and bolts *g*, which form a truss and transmit the downward pressure to a lateral pull or draw upon the bolster, as will be fully understood by referring to Fig. 3.

The bolts *g*, of which there are four, have nuts *p* on them below the bolster A, said nuts bearing on plates *q*, which rest on levers *r r*, two being at each side of the block G. These levers *r* rest on the trunnions *l l* of the boxes F F, and keep the same in proper position on the frame *m*. (See Fig. 3.) I would remark that the front gearing of a vehicle may be constructed and arranged like the back gearing herein described, slight modifications being only required to admit of the turning of the front axle.

The advantages accruing from the making of the arms C C to turn with the wheels irrespective of my peculiar construction and arrangement are very marked, and are well known. Among these are the following:

First. A greater ability to resist a skewing or side strain on a wheel by reason of the great length allowable between the box D and the box F.

Second. The ability to use a hub of small diameter possessing sufficient strength, as the hub is not weakened as hitherto by the passing through it of an arm sufficiently strong to resist the entire strain.

Third. The avoidance of the most fruitful source of injury to wheels—to wit, the loosening of the spokes in the hubs, caused by the lubricating material finding its way into the mortises of the hub.

Fourth. The convenience of lubricating the arms, no parts requiring to be removed.

Fifth. The facility of applying springs like the rubber *h* more directly between the wheel and the supported parts than usual, so that less of the inertia of the bolster A and its attachments requires to be overcome in running the wheel over an uneven surface.

Sixth. The facility of applying reservoirs of oil analogous to those in railroad-car axle, boxes. This may be done with very great advantage in every instance where the axles are liable to be neglected.

Seventh. The wheels may be more securely attached to the vehicle.

Eighth. No discrimination requires to be made in the manufacture of the arms between those used at the right and left sides of the vehicle. One and the same will answer for either side, and a vast deal of trouble and expense is thereby saved to both the maker and user.

Ninth. The avoiding of the necessity of giving the arms of the wheels an oblique position, as is now required, in order to give the wheels an inclination to press toward the shoulders of the axle. By dispensing with this much friction is avoided, and a much lighter draft is obtained.

By my invention these advantages above enumerated are realized in a high degree, as also the following, which are more directy due to my peculiar construction and arrangement of the parts:

First. By my manufacture of the hub B and arm C in two separate pieces, strongly socketed and bolted together in the manner shown, I am able to remove the wheel for resetting the tire, &c., with little disturbance of the parts, and to substitute a new hub in case of failure from any cause with but little difficulty or expense.

Second. By my arrangement of the truss-rods *f* relatively to the several other parts I am able to secure the advantages of very great rigidity or stiffness in the entire work with very little weight.

Third. By my arrangement of the relativley slight springs *s* and *h* in the described relation to the other parts, either alone or in addition to ordinary springs, my carriage runs considerably easier for the horses on a pavement (or other hard surface with slight inequalities,) and runs with less noise. These parts are constructed with little expense, and their liability to failure is slight, because the rubber is effectually housed and protected within the bolster, and the whole is saved from lateral strain by the guide-pin *i*.

Fourth. By my arrangement of the arms C and of the two parts *k k*, with their trunnions *l l*, which together form the box F, embracing the inner end of the arm C, in the manner shown, with my arrangement; also, of the levers *r r* and cast-iron frame *m*, or their equivalents, embracing the trunnions *l l*, in the manner shown, and connecting each arm C with the block G in the manner shown, I am able to hold each wheel very firmly, so as very effectually to resist end-play, or an endwise movement of the arm C under all of the severe strains to which it is liable to be exposed, and yet allow the outer end of the arm C, carrying the wheel B to rise and sink freely by the turning of the inner box, F, on its trunnions *l l*, with every yielding of the springs *s* and *h*, or with every yielding of other springs which serve to control its position.

Having now fully described my invention, what I claim as new, and desire to secure by Letters Patent, is—

1. In wheel-vehicles, the arrangement of the rotating arm C and the wheel-hub or center B, the latter being fitted within the other, and confined and released by the bolt C, or its equivalent, substantially in the manner and for the purpose herein set forth.

2. In wheel-vehicles, the arrangement of the bolster A, truss-rods *f*, center frame or part, G, outer bearing frames, E, or its equivalent, and a rotating arm, C, carrying a wheel rigidly connected, substantially as and for the purpose herein set forth.

3. In wheel-vehicles, having a rotating-arm, C, rigidly connected with the wheel B, the within-descibed and represented arrangement of the springs *s* and *h*, and guiding-pin *i*, relatively to the bolster A, hole *j*, and box D, or their equivalents, for the purpose above set forth.

4. In wheel-vehicles, the within-described arrangement of the rotating arm C, parts *k k*, and trunnions *l l* relatively to the levers *r r*, frame *m*, and block G, or their respective equivalents, for the purpose above set forth.

OREN E. MILES.

Witnesses:
OLIVER DEWEY,
H. F. VAN NORTWICK.